United States Patent [19]

Neal

[11] 4,441,451
[45] Apr. 10, 1984

[54] DISPOSABLE KITTY LITTER BOX

[76] Inventor: Dennis E. Neal, 5322 O'Shea La., Stone Mountain, Ga. 30088

[21] Appl. No.: 359,056

[22] Filed: Mar. 17, 1982

[51] Int. Cl.³ .............................................. A01K 29/00
[52] U.S. Cl. ............................................. 119/1; 229/35
[58] Field of Search ........................ 119/1; 229/33, 35

[56] References Cited

U.S. PATENT DOCUMENTS

| | | | |
|---|---|---|---|
| 2,565,053 | 8/1951 | Stenger | 229/35 |
| 2,707,587 | 5/1955 | Wittstein | 229/33 |
| 3,154,052 | 10/1964 | Sweeney . | |
| 3,170,618 | 2/1965 | Sweeney | 229/33 |
| 3,499,596 | 3/1970 | McCormick | 229/35 |
| 3,581,975 | 6/1971 | Riccio . | |
| 3,684,155 | 8/1972 | Smith . | |
| 3,743,170 | 7/1973 | Riccio . | |
| 3,745,975 | 7/1973 | Prucha . | |

FOREIGN PATENT DOCUMENTS 2222942 10/1974 France ................................. 119/1

Primary Examiner—Jay N. Eskovitz
Attorney, Agent, or Firm—Wenderoth, Lind & Ponack

[57] ABSTRACT

A disposable kitty litter box includes a box bottom having its inside completely sealed against moisture and further having two sets of opposite side walls, one set of which has three moisture barriers. A box top is sized so that the box bottom will fit inside the box top when the box top is turned upside down. Thus, the box top in its upside down position serves as an additional moisture barrier. For shipping purposes, a litter package is placed inside the box bottom. The box top is sized to slightly larger dimensions than the box bottom in order to ensure a close fit therewith.

4 Claims, 7 Drawing Figures

DISPOSABLE KITTY LITTER BOX

BACKGROUND OF THE INVENTION

1. Field of the Invention

This invention relates to animal husbandry and, in particular, to paper receptacles of the folded blank box-type for disposing of animal wastes.

2. Description of the Prior Art

Many cat waste stations, euphemistically referred to by pet owners as kitty litter boxes, are made of plastic. An exemplary tray-like box is shown in U.S. Pat. No. 3,745,975. Every three to six days, these boxes must be cleaned out, i.e., the wastes must be separated and disposed of and the plastic tray must be washed and dried. New litter, which may be moisture-absorbing clay pellets or other granular materials, is then placed in the bottom of the box. This is a messy and disagreeable task for most pet owners.

In order to make this task less unpleasant, some manufacturers have begun supplying their kitty litter boxes with plastic liners as a supposedly more convenient and more readily disposable means for carrying out the task. An example of such a prior art device is shown in U.S. Pat. No. 3,684,155. However, this solution has not been satisfactory because the plastic liners have no absorbing ability and cats often quite easily rip through the liners with their claws. Therefore, the noxious smell is not curtailed and occasionally becomes more unpleasant if some of the animal wastes are trapped in part by a plastic liner.

Another way of making the clean-up task less unpleasant has been the substitution of the plastic trays by some manufacturers with throwaway paper receptacles. Examples of such prior art structures are shown in U.S. Pat. Nos. 3,743,170; 3,581,975; 3,170,618; and 3,154,052. However, the common fault with each of these boxes is that there is only one layer of paper between the kitty litter and the floor of the pet owner's dwelling. Such a single layer, even though it may be thick, is usually insufficient to prevent the wetting of the floor, particularly if the animal waste is liquid, because moisture readily diffuses through paper.

Thus, it has remained a problem in the prior art to develop a pet relief station which will not leak and which is readily disposable.

SUMMARY OF THE INVENTION

It is a primary object of the present invention to provide a pet relief station, in the nature of a kitty litter box, which is moisture proof, protects against loss of kitty litter, and is readily disposable.

This object is accomplished by providing a kitty litter with a box top of a slightly larger size than the box bottom so that it may double as an extra barrier against mositure and loss of kitty litter when it is turned upside down and the box bottom is placed therein.

DETAILED DESCRIPTION OF THE PREFERRED EMBODIMENT

Figure 1:
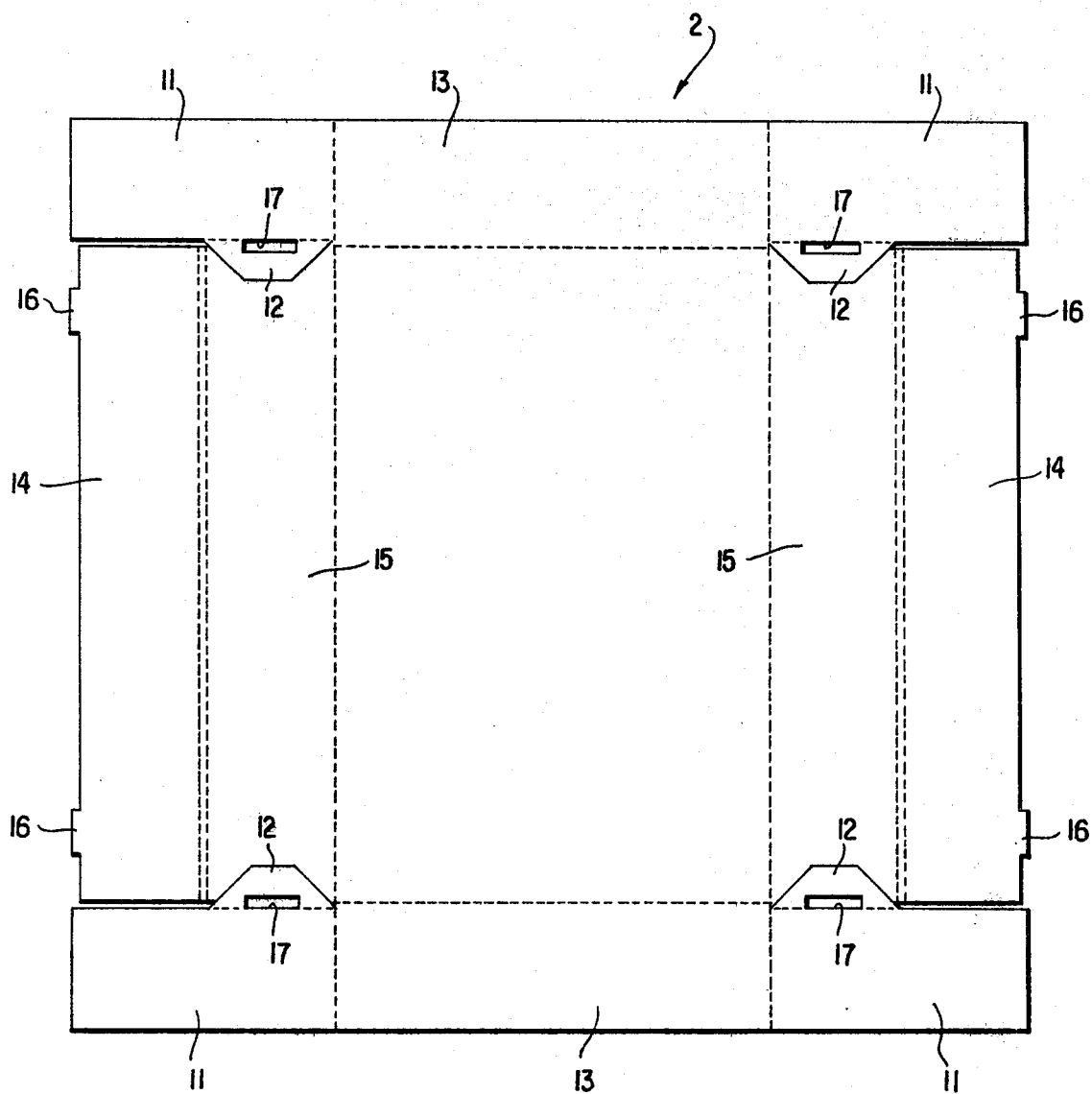
FIG. 1 is a top plan view showing a box bottom lying flat, having been cut along the solid lines and being foldable along the dashed lines.

In FIG. 1, a box bottom 2 is shown lying flat. The solid lines indicate cuts already made while the dashed lines indicate folds to be made.

Figure 2:
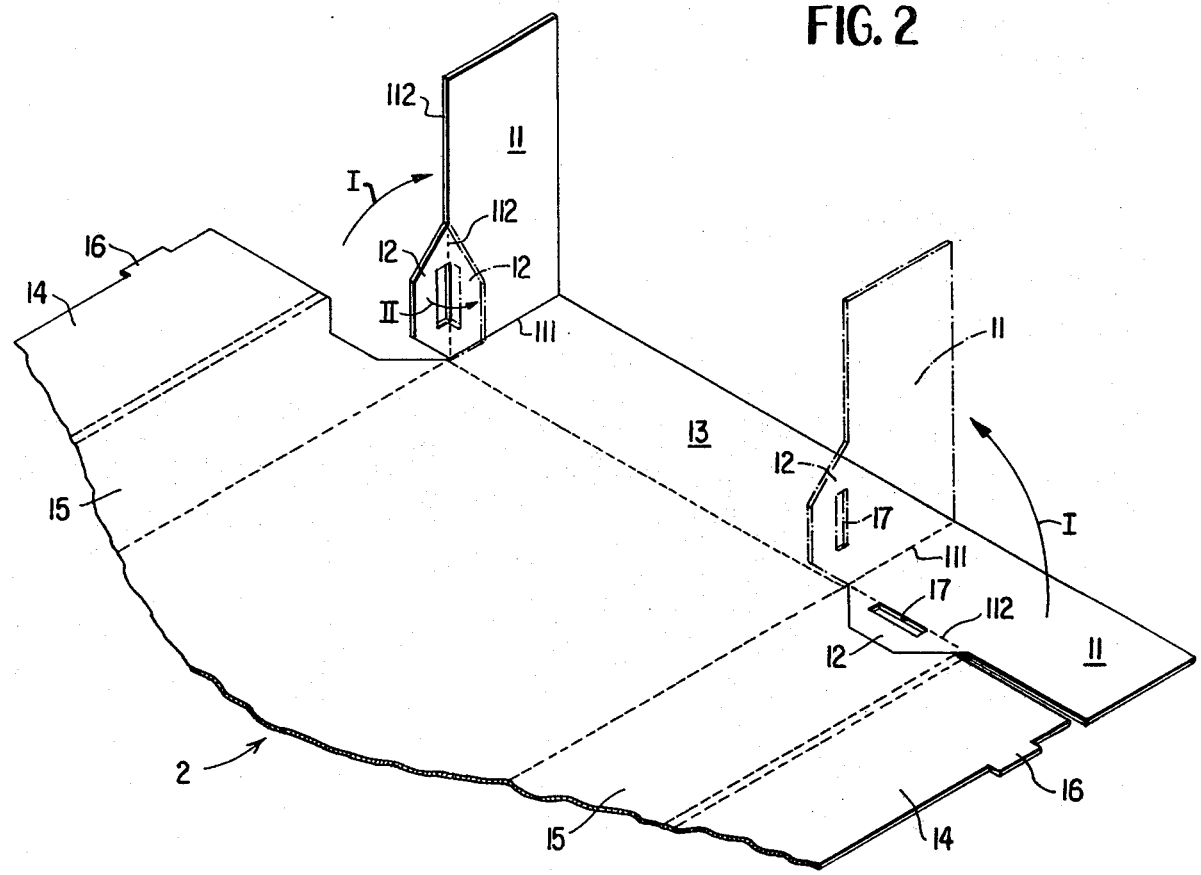
FIG. 2 is a partial perspective view showing the process for folding up the short side of the box bottom in three steps.

In FIG. 2, a short side 13 on the upper portion of the box bottom 2 is shown being folded up in three steps. In step I, the corner flaps 11 are folded upwardly along lines 111 into vertically upstanding positions. In step II, ears 12 are flipped 90° around cut edges 112 along corner flaps 11.

Figure 3:
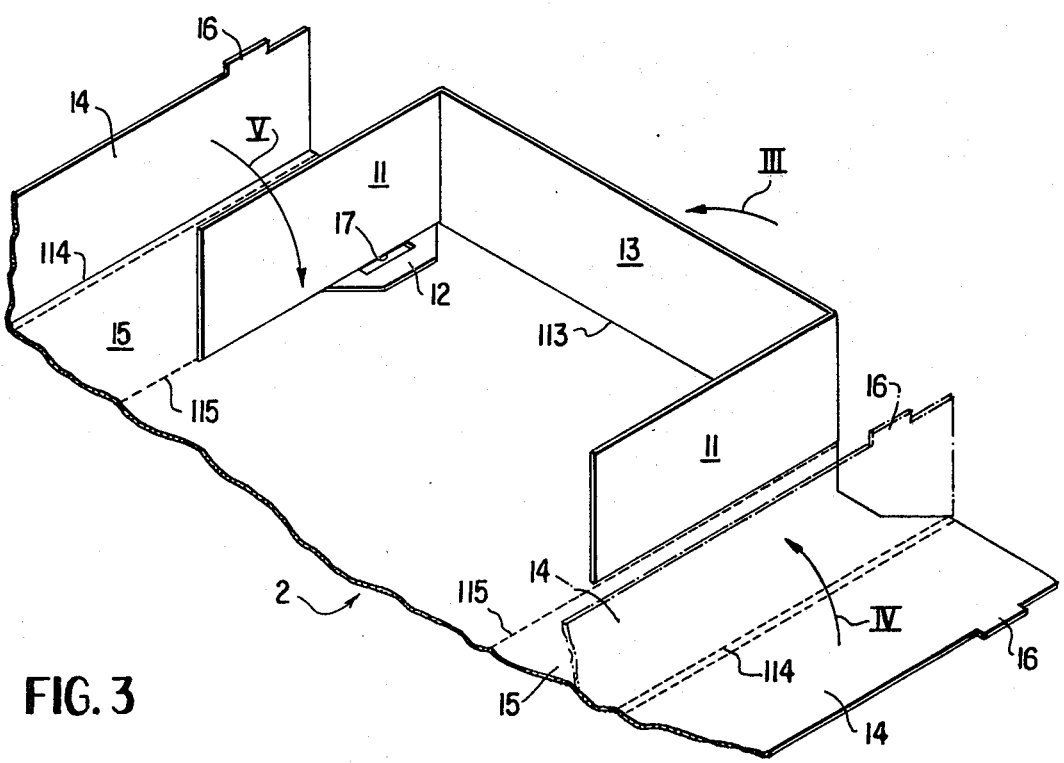
FIG. 3 is a partial perspective view showing the process for folding up the long side of the box bottom in three additional steps.

In step III, shown in FIG. 3, the short side 13, carrying corner flaps 11 and ears 12, is bent up 90° along fold line 113. In step IV, also shown in FIG. 3, outer long side flaps 14 are folded upwardly along lines 114 into vertically upstanding positions. In step V, outer long side flaps 14 and inner long side flaps 15 are brought over upstanding corner flaps 11 by folding along lines 115.

Figure 4:
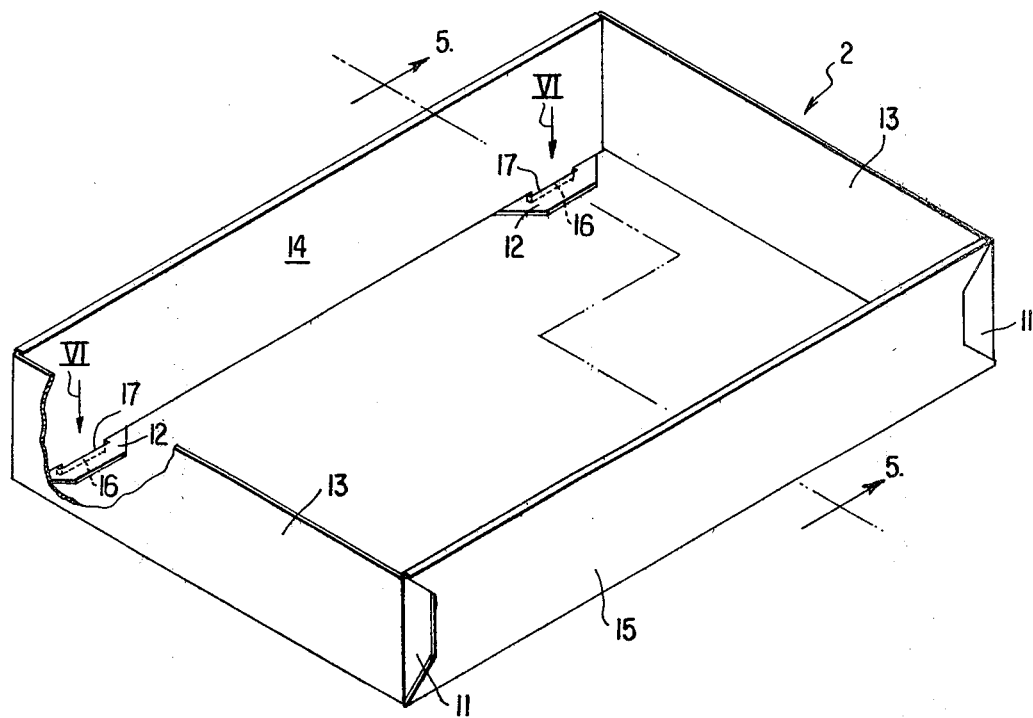
FIG. 4 is a cut-away perspective view of the box bottom in its completely folded up condition.

In FIG. 4, step VI is shown in which tabs 16 on outer long side flaps 14 are inserted into slots 17 of ears 12. At this point, box bottom 2 is assembled and has its inside completely sealed against moisture. On the left-hand side of FIG. 5, the assembled box bottom 2 is shown in cross-section through a tab 16.

Figure 6:
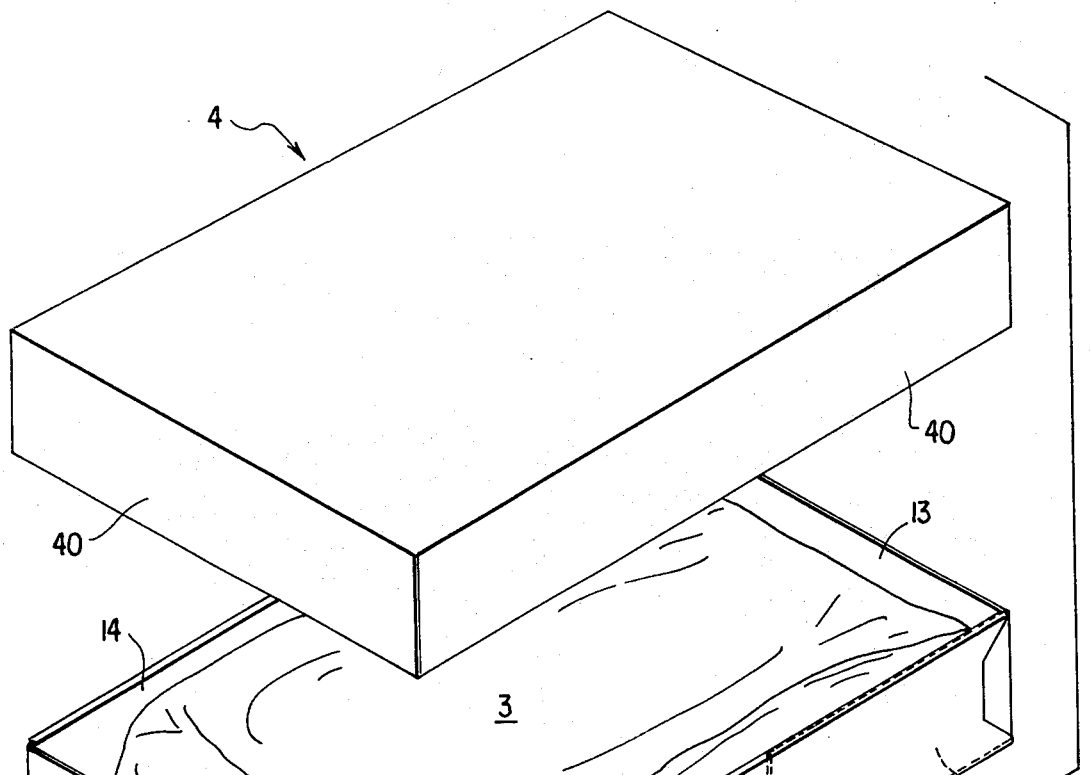
FIG. 6 is an exploded view showing a packaged litter bag after its placement into the bottom of the box bottom and before the placement of the box top thereover.

After the box bottom 2 is assembled, a litter box 1, shown in FIG. 6, is ready to be prepared in two easy steps. First, a litter package 3 is placed in the box bottom 2. In the second step, a box top 4 is placed over the box bottom 2 containing the litter package 3. After securing of the box top 4 to the box bottom 2 by taping or other suitable means, the litter box 1 is ready for shipment as a kit to retail outlets.

Figure 7:
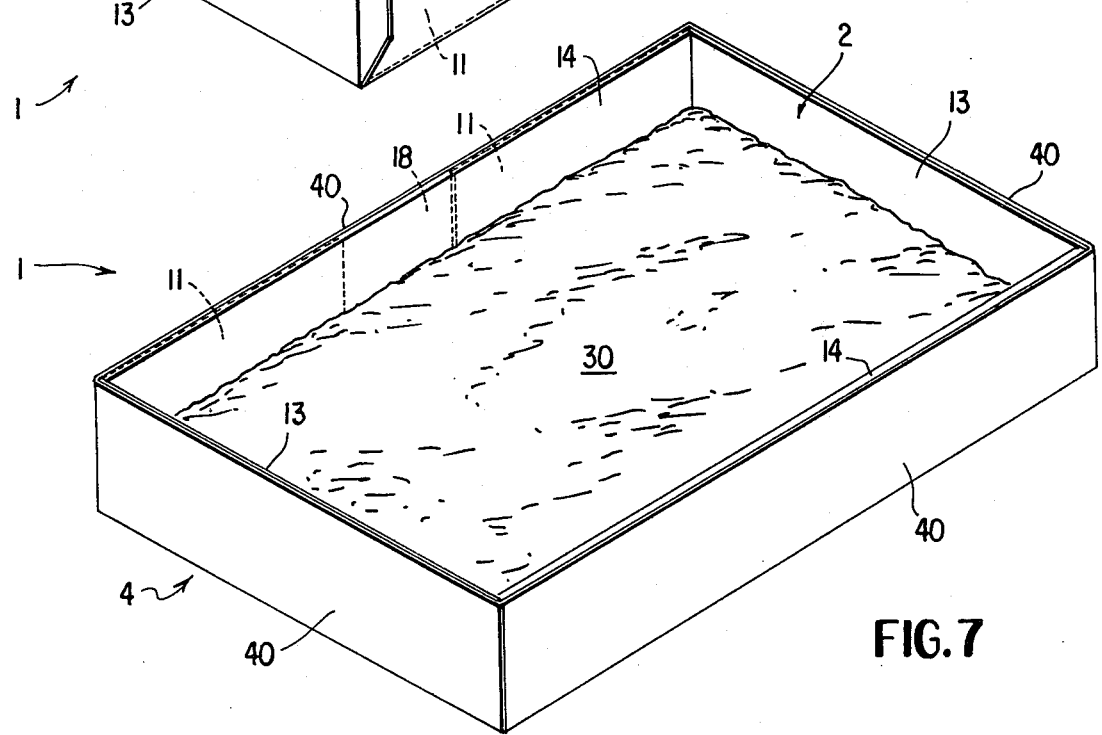
FIG. 7 is a full perspective view showing the litter unpackaged and placed in the box bottom which has been placed inside the upside down box top.

After purchase of the kit at a retail outlet, a pet owner may prepare the litter box 1, as shown in its readied condition in FIG. 7, for use by his or her cat in three easy steps. First, the box top 4 is unsecured from the box bottom 2 and placed upside down. Second, the box bottom 2 is placed inside the upside down box top 4. Third, the package 3 is opened and litter 30 is poured into the box bottom 2. The kitty litter box 1 is now ready for use by one's cat.

As shown in FIG. 7, box top 4 is slightly larger than box bottom 2 so that the latter may closely fit inside the former. Side walls 40 of box top 4 are slightly higher than flaps 13 and 14 which have been transformed into side walls of box bottom 2. Alternatively, side walls 40 of box top 4 may be the same height as flaps 13 and 14 of box bottom 2. A key advantage of having the side walls 40 of box top 4 be substantially the same or of a slightly higher height than flaps 13 and 14 of box bottom 2 is that the box top 4 serves as an additional barrier layer either against moisture emanating from the litter 30 wetted by a female cat or against urine sprayed on flaps 13 and 14 by a male cat.

Figure 5:
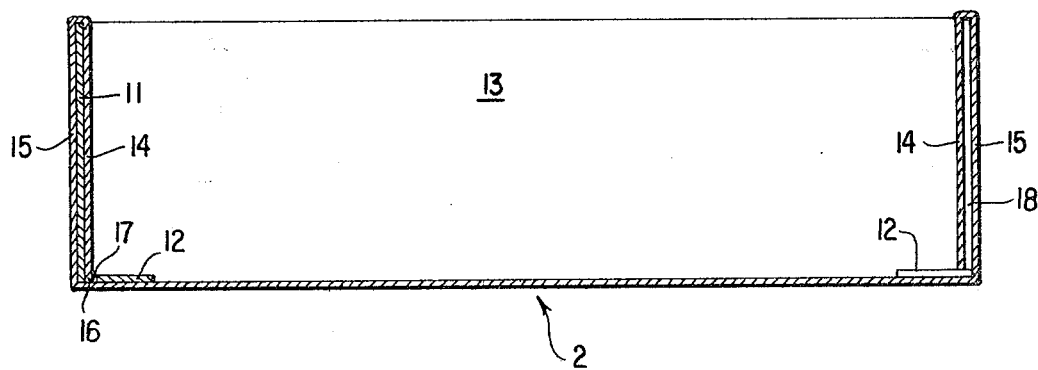
FIG. 5 is a cross-sectional view of the box bottom taken along line 5—5 in FIG. 4.

Flaps 14 along the longer sides of the box bottom 2 comprise the major part of the inside perimeter of the litter box 1 and, as best seen in FIG. 5, are backed up by flaps 15 which serve as additional moisture barriers all along their length. Furthermore, as also shown by the left-hand side of FIG. 5, flaps 11 serve as second additional moisture barriers at least along their own lengths. From a view of FIG. 3 and the right-hand side of FIG. 5, it is clear that, in the areas where flaps 11 do not extend, there will be at least intermediate air spaces 18 serving as moisture barriers between flaps 14 and 15. In an alternate embodiment using a square litter box rather than a rectangular box 1 shown in the drawings, the lengths of the corner flaps 11 may be sized so that they extend along the entire side of the box bottom, thus eliminating any intermediate air spaces 18 between flaps 14 and 15.

Although the invention looks deceptively simple in FIG. 7, there are at least two and at some portions, as many as four moisture barriers provided along the upstanding walls of the kitty litter box 1. For example, on the short sides of box 1, there are moisture barriers comprised of flap 13 of box bottom 2 and side wall 40 of box top 4. Along the long sides of box 1, there are four moisture barriers, best realized by viewing FIGS. 5 and 7 together from the inside to the outside. These barriers are comprised of flap 14, flap 11 or air space 18, and flap 15 of box bottom 2 as well as side wall 40 of box top 4. There are also two bottom moisture barriers.

The kitty litter box 1 may be disposed of in the following manner. First, the box bottom 2 containing the used litter 30 is lifted out of the inside of the upside down box top 4. Second, box top 4 is flipped over right side up and placed over the box bottom 2 containing the used litter 30. Finally, the entire kitty litter box 1 is thrown away. However, depending upon the nature of the disposal system, it may be advisable to tape the box top 4 securely to the box bottom 2. Thus, as it may be readily seen, the kitty litter box is easily disposed of without the need for separating the animal wastes from the litter in a plastic tray and without the further need for washing and drying the plastic tray before reuse.

Also, because the kitty litter box 1 of the present invention is made from a single cut and folded cardboard box blank, it is inexpensive to manufacture and may be sold at low cost. Pet owners will prefer to purchase on a regular basis the cheap litter box 1 because of its easy disposal method rather than purchase the more costly plastic structures of the prior art with their disagreeable cleaning tasks even though such purchases may be made on a less frequent basis.

The foregoing preferred embodiment is considered illustrative only. Numerous other modifications will readily occur to those skilled in the arts of animal husbandry and paper receptable manufacturing. Consequently, the disclosed invention is not limited to the exact construction and process of manufacturing shown and described hereinabove but is defined by the claims appended hereto.

I claim:

1. A disposable kitty litter box comprising:
   a. a box bottom having its inside completely sealed against moisture by its bottom and side walls, and
   b. a box top being sized such that the box bottom will fit inside the box top whenever said box top is turned upside down;

said box bottom has two sets of opposite side walls, one set of which has three moisture barriers, one of the barriers having first attachment means, communicating with second attachment means on another of the barriers, for holding the three moisture barriers in alignment while the box bottom is maintained completely sealed;

whereby said box top in its upside down position serves as an additional moisture barrier for the bottom and side walls of the box bottom.

2. The disposable kitty litter box, according to claim 1, wherein:
   said box top is sized to slightly larger dimensions than the box bottom in order to ensure a close fit therewith.

3. The disposable kitty litter box, according to claim 1, further comprising:
   a litter package placed inside the box bottom.

4. The disposable kitty litter box, according to claim 1, wherein:
   said box bottom and top are made of cardboard.

* * * * *